United States Patent
Nara et al.

(10) Patent No.: US 11,413,962 B2
(45) Date of Patent: Aug. 16, 2022

(54) IN-VEHICLE APPARATUS AND INFORMATION PRESENTATION METHOD

(71) Applicants: Clarion Co., Ltd., Saitama (JP); KISHI MIRAI INC., Yokohama (JP)

(72) Inventors: Norikazu Nara, Saitama (JP); Noriyuki Abe, Saitama (JP); Makoto Orino, Hitachi (JP); Takaaki Yashiro, Hitachi (JP); Toshihiro Mochizuki, Saitama (JP); Norimasa Kishi, Yokohama (JP)

(73) Assignee: Clarion Co., Ltd., Kanagawa (JP)

( * ) Notice: Subject to any disclaimer, the term of this patent is extended or adjusted under 35 U.S.C. 154(b) by 162 days.

(21) Appl. No.: 16/772,718

(22) PCT Filed: Dec. 7, 2018

(86) PCT No.: PCT/JP2018/045163
§ 371 (c)(1),
(2) Date: Jun. 12, 2020

(87) PCT Pub. No.: WO2019/117046
PCT Pub. Date: Jun. 20, 2019

(65) Prior Publication Data
US 2020/0317054 A1    Oct. 8, 2020

(30) Foreign Application Priority Data

Dec. 14, 2017    (JP) .............................. JP2017-240002

(51) Int. Cl.
*B60K 35/00*    (2006.01)
*G01C 21/36*    (2006.01)

(52) U.S. Cl.
CPC ............ *B60K 35/00* (2013.01); *G01C 21/367* (2013.01); *G01C 21/3697* (2013.01);
(Continued)

(58) Field of Classification Search
CPC .............. B60K 35/00; B60K 2370/152; B60K 2370/119; B60K 2370/52;
(Continued)

(56) References Cited

U.S. PATENT DOCUMENTS 9,157,760 B2 * 10/2015 Aoki ................... G01C 21/3697
10,021,052 B1 * 7/2018 Morris ................. G06F 16/168
(Continued)

FOREIGN PATENT DOCUMENTS

JP    3602482 B2 * 12/2004
JP    2010-217944 A    9/2010
(Continued)

OTHER PUBLICATIONS

Vu et al., "Adaptive Control of Video Display for Diagnostic Assistance by Analysis of Capsule Endoscopic Images," 2006, vol. 3, Publisher: IEEE.*

(Continued)

*Primary Examiner* — Tuan C To
(74) *Attorney, Agent, or Firm* — Lewis Roca Rothgerber Christie LLP

(57) ABSTRACT

An in-vehicle apparatus mounted in a vehicle includes: an assistance processing unit that executes assistance processing for providing a user with specified information; and a display control unit that performs control to display a list according to a sequential order of the assistance processing executed by the assistance processing unit.

9 Claims, 7 Drawing Sheets

(52) U.S. Cl.
CPC ... *B60K 2370/119* (2019.05); *B60K 2370/152* (2019.05); *B60K 2370/164* (2019.05); *B60K 2370/166* (2019.05); *B60K 2370/52* (2019.05)

(58) Field of Classification Search
CPC ............ B60K 2370/154; G01C 21/367; G01C 21/3697; G06K 2370/166
USPC .......................................................... 701/36
See application file for complete search history.

(56) References Cited

U.S. PATENT DOCUMENTS

| | | | | |
|---|---|---|---|---|
| 2013/0311081 | A1* | 11/2013 | Yamakawa | G01C 21/34 701/428 |
| 2015/0100231 | A1* | 4/2015 | Weir | G01C 21/34 701/400 |
| 2017/0122765 | A1* | 5/2017 | Boss | G01C 21/3629 |
| 2017/0192637 | A1* | 7/2017 | Ren | G06Q 30/0269 |
| 2017/0262790 | A1* | 9/2017 | Khasis | G08G 1/0116 |
| 2017/0305440 | A1* | 10/2017 | Oba | B60W 50/08 |
| 2017/0358113 | A1* | 12/2017 | Bray | G01C 21/3667 |
| 2018/0180437 | A1* | 6/2018 | Uhlendorf | G01C 21/367 |
| 2018/0283889 | A1* | 10/2018 | Koo | G01C 21/3484 |
| 2018/0314420 | A1* | 11/2018 | Bouaziz | G06F 3/0488 |

FOREIGN PATENT DOCUMENTS

| | | | | |
|---|---|---|---|---|
| JP | 2014206402 | A | * | 10/2014 |
| JP | 2015-102520 | A | | 6/2015 |
| JP | 2015102520 | A | * | 6/2015 |
| KR | 19980018334 | A | * | 6/1998 ........... G01C 21/367 |

OTHER PUBLICATIONS

S. Sugimoto et al., "Obstacle detection using millimeter-wave radar and its visualization on image sequence," 2004, vol. 3, Publisher: IEEE.*

Shinko et al., "Active Heads-up Display based Speed Compliance Aid for Driver Assistance: A Novel Interface and Comparative Experimental Studies," 2007, Publisher: IEEE.*

International Search Report of corresponding PCT/JP2018/045163 with English translation, and Written Opinion of corresponding PCT/JP2018/045163, dated Jan. 15, 2019, 9 pages.

Japanese Office Action dated Dec. 14, 2021 regarding Japanese Patent Application No. 2017-240002 corresponding to U.S. Appl. No. 16/772,718 (3 pages) with English Machine Translation (4 pages).

* cited by examiner

FIG.2
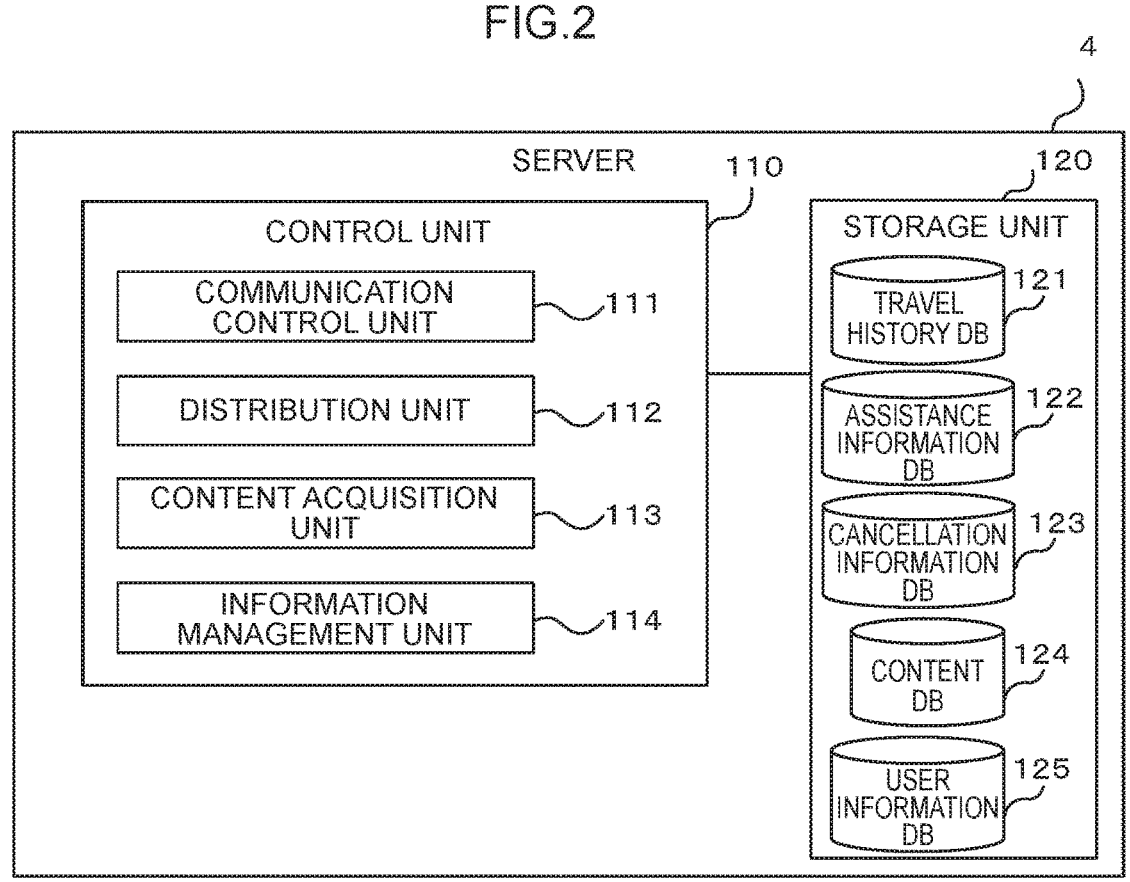
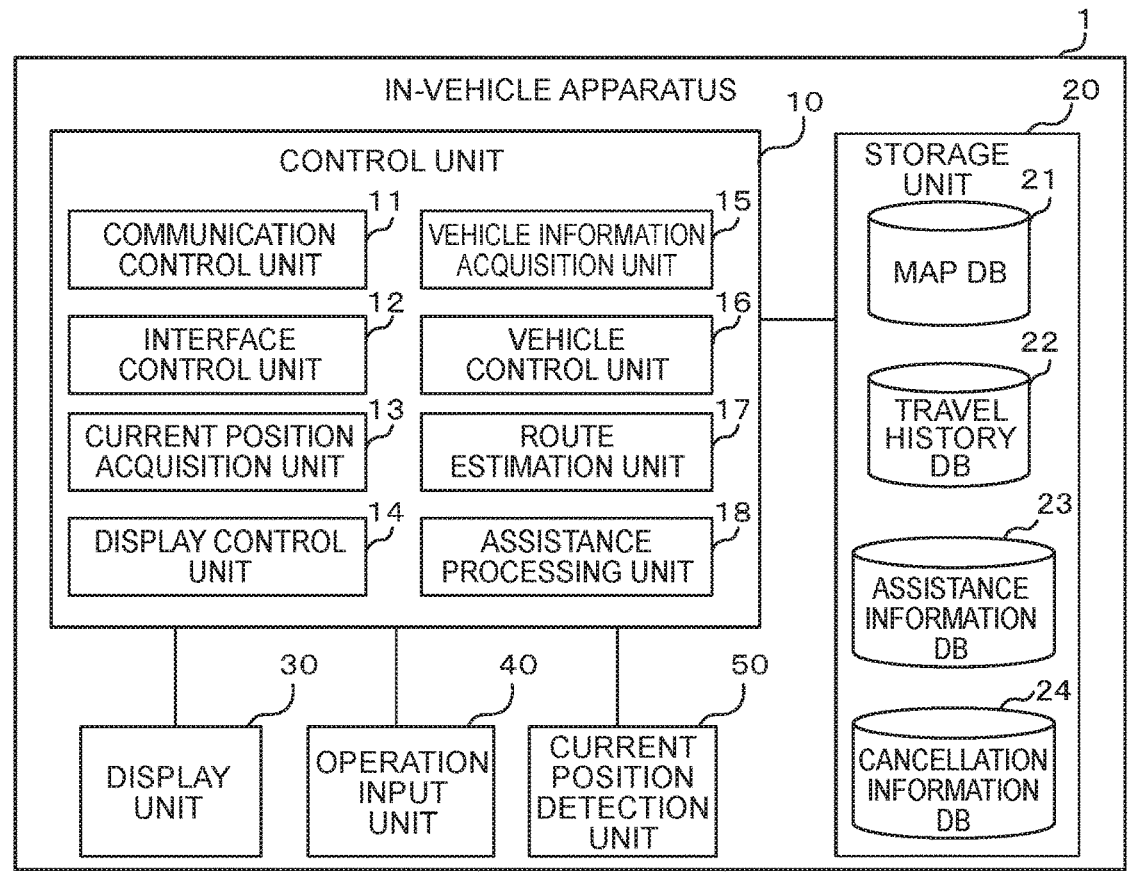

IN-VEHICLE APPARATUS AND INFORMATION PRESENTATION METHOD

CROSS-REFERENCE TO RELATED APPLICATION(S)

This application is a U.S. National Phase Patent Application and claims priority to and the benefit of International Application Number PCT/JP2018/045163, filed on Dec. 7, 2018, which claims priority of Japanese Patent Application Number 2017-240002, filed on Dec. 14, 2017, the entire contents of all of which are incorporated herein by reference.

TECHNICAL FIELD

The present invention relates to an in-vehicle apparatus and an information presentation method.

BACKGROUND ART

In recent years, car navigation systems which not just guide users to a route to a destination, but also provide the users with various pieces of content such as videos and music have been becoming widespread. In this regard, for example, PTL 1 mentioned below discloses a mobile terminal capable of automatically providing appropriate content according to the status of a vehicle by acquiring vehicle information from automobile information equipment, selecting content corresponding to the acquired vehicle information, and displaying the selected content on a display.

CITATION LIST

Patent Literature

PTL 1: Japanese Patent Application Laid-Open (Kokai) Publication No. 2010-217944

SUMMARY OF THE INVENTION

Problems to be Solved by the Invention

The mobile terminal disclosed by PTL 1 cannot let a user know in advance what content is scheduled to be provided in which order. Therefore, the user will be abruptly provided with information regardless of their own intention, so that the user will feel a sense of discomfort.

Means to Solve the Problems

An in-vehicle apparatus according to the present invention is mounted in a vehicle and includes: an assistance processing unit that executes assistance processing for providing a user with specified information; and a display control unit that performs control to display a list according to a sequential order of the assistance processing executed by the assistance processing unit.

An information presentation method according to the present invention is designed to notify a user of a schedule for executing assistance processing to be executed by an in-vehicle apparatus mounted in a vehicle to provide the user with specified information, wherein the information presentation method includes: a step of creating a list of the assistance processing according to a sequential execution order; and a step of performing control to display the list of the assistance processing.

Advantageous Effects of the Invention

The user's sense of discomfort felt when the information is provided can be alleviated according to the present invention.

BRIEF DESCRIPTION OF DRAWINGS

FIG. 2 is a configuration diagram of an in-vehicle apparatus and a server according to one embodiment of the present invention;

DESCRIPTION OF EMBODIMENTS

Figure 1:
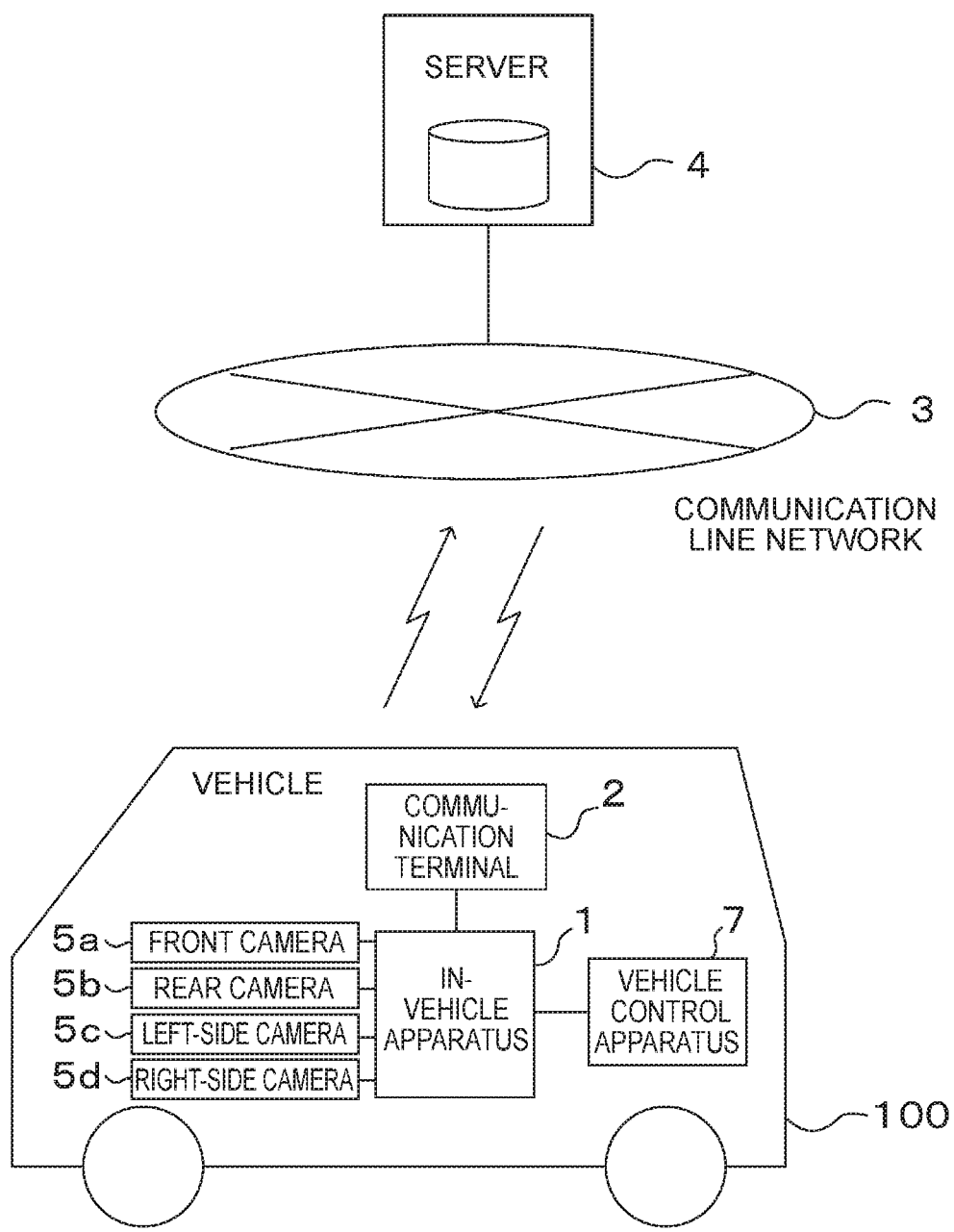
FIG. 1 is a configuration diagram of an information provision system according to one embodiment of the present invention.

One embodiment of the present invention will be explained with reference to the drawings. FIG. 1 is a configuration diagram of an information provision system according to one embodiment of the present invention. The information provision system illustrated in FIG. 1 is designed to provide a user who rides in a vehicle 100 with various information according to a traveling status of the vehicle 100 and is configured of an in-vehicle apparatus 1 and a communication terminal 2, which are mounted in the vehicle 100, a communication line network 3, and a server 4. Incidentally, the in-vehicle apparatus 1 and the communication terminal 2 are connected via wired or wireless connection.

The in-vehicle apparatus 1 provides the user who is a driver of the vehicle 100 with various information according to the traveling status of the vehicle 100 by executing assistance processing described later. The in-vehicle apparatus 1 is connected to: a front camera 5a, a rear camera 5b, a left-side camera 5c, and a right-side camera 5d which are mounted in the vehicle 100, respectively, facing the front side, the rear side, and the right and left sides of the vehicle 100; and a vehicle control apparatus 7 that performs various processing and control relating to traveling of the vehicle 100. Incidentally, in the following explanation, the front camera 5a, the rear camera 5b, the left-side camera 5c, and the right-side camera 5d may be sometimes collectively referred to as a "camera 5." The vehicle control apparatus 7 is, for example, an ECU (Electronic Control Unit) and the vehicle 100 is equipped with various types of vehicle control apparatuses depending on their functions and control objects.

The communication terminal 2 wirelessly connects to the communication line network 3 as necessary under control of the in-vehicle apparatus 1. The communication line network 3 is connected to the server 4. Specifically, the in-vehicle apparatus 1 can communicate with the server 4 by connecting to the server 4 via the communication terminal 2 and the communication line network 3. When the communication terminal 2 and the communication line network 3 are connected wirelessly, wireless base stations which the communication line network 3 has and which are not illustrated in the drawing are used. These wireless base stations can wireless communicate with the communication terminal 2 located within their surrounding specified communication areas, and are installed at various locations. Incidentally, the communication terminal 2 is, for example, a mobile phone. Furthermore, the communication line network 3 is constructed by, for example, a mobile phone network or the Internet.

When the server 4 receives a request for distribution of content transmitted from the in-vehicle apparatus 1 via the communication terminal 2 and the communication line network 3, it distributes the content according to this request to the in-vehicle apparatus 1. The in-vehicle apparatus 1 can provide the user with the content received from the server 4 via screen display and sound output. Furthermore, the server 4 stores a travel history of the vehicle 100 and assistance information used by the in-vehicle apparatus 1 when executing the assistance processing. The in-vehicle apparatus 1 can estimate a travel route for the vehicle 100 and provide the user with the information by downloading these pieces of information from the server 4.

Incidentally, FIG. 1 illustrates an example where one in-vehicle apparatus 1 mounted in one vehicle 100 is connected to the server 4; however, practically, in-vehicle apparatuses respectively mounted in a large number of vehicles are connected to the server 4 and each in-vehicle apparatus provides their user with information. In this embodiment, actions of one in-vehicle apparatus 1 among them will be explained as a representative example, but other in-vehicle apparatuses operate in the same manner.

FIG. 2 is a configuration diagram of the in-vehicle apparatus 1 and the server 4 according to one embodiment of the present invention. The in-vehicle apparatus 1 includes, as illustrated in FIG. 2, a control unit 10, a storage unit 20, a display unit 30, an operation input unit 40, and a current position detection unit 50. The server 4 includes a control unit 110 and a storage unit 120.

The control unit 10 for the in-vehicle apparatus 1 is configured of a CPU, a ROM, a RAM, and so on which are not illustrated in the drawing and performs various processing and arithmetic operations to operate the in-vehicle apparatus 1. The control unit 10 has, as its functions, the respective functional blocks of a communication control unit 11, an interface control unit 12, a current position acquisition unit 13, a display control unit 14, a vehicle information acquisition unit 15, a vehicle control unit 16, a route estimation unit 17, and an assistance processing unit 18. The control unit 10 can implement these functional blocks by, for example, decompressing programs, which are stored in the ROM, in the RAM and having the CPU execute the programs. Incidentally, the details of these functional blocks possessed by the control unit 10 will be explained later.

The storage unit 20 is a nonvolatile storage medium and is configured by using, for example, an HDD (hard disk drive), an SSD (solid state drive), or a memory card. The storage unit 20 includes a map DB 21 which is a database formed with various information relating to roads and maps where the vehicle 100 has traveled, for example, information such as positions, connections, shapes, widths, and the number of lanes of roads and information such as landforms, city names, and area names. Specifically speaking, map information for displaying a map screen on the in-vehicle apparatus 1 is stored as the map DB 21 in the storage unit 20. Furthermore, the storage unit 20 includes: a travel history DB 22 which indicates a travel history of the vehicle 100; an assistance information DB 23 which stores the aforementioned assistance information; and a cancellation information DB 24 about a history of cancellation operations performed by the user with respect to the assistance processing. Incidentally, some or all of programs executed by the CPU in the control unit 10 may be stored in the storage unit 20.

The display unit 30 displays various images and videos according to control of the display control unit 14. The display unit 30 is configured by using, for example, a liquid-crystal display.

The operation input unit 40 accepts operation input from the user and outputs operation information to the control unit 10 according to the operation content. The operation input unit 40 is configured of, for example, a touch panel and various kinds of switch groups which are integrated with the display unit 30.

The current position detection unit 50 detects a current position of the vehicle 100, that is, a current position of the user who is riding in the vehicle 100 and outputs the detection result to the control unit 10. The current position detection unit 50 is configured by using, for example, a GPS sensor. Incidentally, when the GPS sensor is used as the current position detection unit 50, the current position based on a GPS signal may be calculated at the control unit 10. The current position of the vehicle 100 (the current position of the user) detected by the current position detection unit 50 will be hereinafter simply referred to as the "current position."

The control unit 110 for the server 4 is configured of a CPU, a ROM, a RAM, and so on which are not illustrated in the drawing and performs various processing and arithmetic operations to operate the server 4. The control unit 110 has, as its functions, the respective functional blocks of a communication control unit 111, a distribution unit 112, a content acquisition unit 113, and an information management unit 114. The control unit 110 can implement these functional blocks by, for example, decompressing programs, which are stored in the ROM, in the RAM and having the CPU execute the programs. Incidentally, the details of these functional blocks possessed by the control unit 110 will be explained later.

The storage unit 120 is a nonvolatile storage medium and is configured by using, for example, an HDD (hard disk drive), an SSD (solid state drive), or a memory card. The storage unit 120 includes: a travel history DB 121 which is a database formed of travel histories of a large number of vehicles including the vehicle 100 connected to the server 4; an assistance information DB 122 which is a database formed of assistance information to be provided to the in-vehicle apparatus of each vehicle; a cancellation information DB 123 which is a database formed of cancellation information about a history of cancellation operations performed by users of the respective in-vehicle apparatuses; a content DB 124 which is a database of content of various images and sounds; and a user information DB 125 which is a database of user information about the users of the respective in-vehicle apparatuses. Incidentally, some or all of programs executed by the CPU in the control unit 110 may be stored in the storage unit 120.

Next, the respective functional blocks of the control unit 10 for the in-vehicle apparatus 1 and the control unit 110 for the server 4 will be explained.

The communication control unit 11 controls the communication terminal 2 when the in-vehicle apparatus 1 communicates with the server 4 via the communication terminal 2 and the communication line network 3. The in-vehicle apparatus 1 can transmit and receive information to and from the server 4 by controlling the communication terminal 2 using the communication control unit 11.

The interface control unit 12 performs interface control when the in-vehicle apparatus 1 communicates with the camera 5 and the vehicle control apparatus 7, respectively. The in-vehicle apparatus 1 communicates with the camera 5 and the vehicle control apparatus 7, respectively, via the interface control performed by the interface control unit 12 and can thereby acquire captured images output from the camera 5 and issue action instructions to the vehicle control apparatus 7.

The current position acquisition unit 13 acquires the current position detection result from the current position detection unit 50.

The display control unit 14 performs control to have the display unit 30 display the map screen by using the map DB 21 stored in the storage unit 20. Furthermore, the display control unit 14 performs control to display, for example, various types of content acquired from the server 4 and images indicating an ambient environment of the vehicle 100, which is generated based on the captured images acquired from the camera 5, on the display unit 30 according to the assistance processing executed by the assistance processing unit 18 and provides the user with such content and images. Furthermore, as the control is performed to cause the display unit 30 to display an execution schedule screen indicating the assistance processing scheduled to be executed by the assistance processing unit 18, the user is notified in advance of what kind of information is provided at which point in time. Incidentally, a specific example of the execution schedule screen displayed on the display unit 30 by the display control unit 14 will be explained later.

The vehicle information acquisition unit 15 acquires various vehicle information about the traveling status of the vehicle 100. The vehicle information acquired by the vehicle information acquisition unit 15 includes, for example, the captured images which are output from the camera 5 and control information which is output from the vehicle control apparatus 7. The vehicle information acquisition unit 15 can acquire these pieces of vehicle information via the interface control unit 12.

The vehicle control unit 16 controls the traveling status of the vehicle 100 by issuing an action instruction to the vehicle control apparatus 7 on the basis of, for example, map information around the current position acquired from the map DB 21 and the vehicle information acquired by the vehicle information acquisition unit 15. Automatic driving of the vehicle 100 is implemented by this action of the vehicle control unit 16. Incidentally, the vehicle control unit 16 can issue the action instruction to the vehicle control apparatus 7 via the interface control unit 12.

The route estimation unit 17 estimates a travel route for the vehicle 100 to travel from now on the basis of the map DB 21 and the travel history DB 22. Incidentally, a history of routes where the vehicle 100 traveled in the past is recorded on a link string basis in the travel history DB 22. The route estimation unit 17 can: estimate the destination where the user is headed by referring to this travel history DB 22; and predict a travel route of the vehicle 100 from the current position to the destination.

The assistance processing unit 18 executes various assistance processing for each piece of information provided to the user on the basis of the assistance information recorded in the assistance information DB 23. The assistance processing unit 18 executes, as the assistance processing, various processing such as processing for providing a weather forecast at the destination, processing for reporting the user's schedule information, processing for playing music according to the user's taste, and processing for automatically displaying images which indicate the ambient environment of the vehicle 100. Under this circumstance, the assistance information is, for example, a script file described in a JSON (JavaScript [registered trademark] Object Notation) format and is composed of information such as a script summary indicating the ID and name of the relevant script file, execution conditions of the relevant script file, and execution actions by the relevant script file. The above-mentioned various kinds of assistance processing is implemented by an interpreter which corresponds to the assistance processing unit 18 accessing the assistance information DB 23 and analyzing and executing an arbitrary script file. Incidentally, the timing when the assistance processing unit 18 executes each assistance processing is decided based on the travel route estimated by the route estimation unit 17. An explanation will be provided later with this regard.

The communication control unit 111 performs communication control which is required when the server 4 communicates with the in-vehicle apparatus 1 via the communication terminal 2 and the communication line network 3. The communication control unit 111 performs, for example, interface processing between the server 4 and the communication line network 3 upon the communication control.

The distribution unit 112 distributes information which is recorded in the travel history DB 121, the assistance information DB 122, the cancellation information DB 123, the content DB 124, and the user information DB 125, respectively, in response to a distribution request from the in-vehicle apparatus 1. For example, when receiving the distribution request for the travel history of the vehicle 100 from the in-vehicle apparatus 1, the distribution unit 112 identifies the user of the in-vehicle apparatus 1 based on the user information DB 125, acquires the travel history of the vehicle 100 corresponding to the relevant user, and distributes it to the in-vehicle apparatus 1. Furthermore, when receiving the distribution request for the assistance information and the content from the in-vehicle apparatus 1, the distribution unit 112 acquires these pieces of information from the assistance information DB 122 and the content DB 124 and distributes them to the in-vehicle apparatus 1. Incidentally, when the distribution unit 112 distributes the information to the in-vehicle apparatus 1, the communication control unit 111 is used to perform communication between the server 4 and the in-vehicle apparatus 1.

The content acquisition unit 113 acquires various pieces of content from an external server, which is not illustrated in the drawing, and accumulates them in the content DB 124. The content acquisition unit 113 can periodically acquire, for example, the content such as weather forecast and facility information of different locations and various kinds of videos and music, respectively, from an arbitrary external server. Incidentally, when the content acquisition unit 113 acquires the content from the external server, the communication is performed between the server 4 and the external server via a communication line such as the Internet.

The information management unit 114 manages information stored in the storage unit 120. For example, the information management unit 114 updates the assistance information DB 122, the cancellation information DB 123, and the user information DB 125 on the basis of information input from an operator of the server 4 and the user of the in-vehicle apparatus 1. Incidentally, the information management unit 114 may automatically generate the assistance information and update the assistance information DB 122. Furthermore, when the latest travel history of the vehicle 100 is transmitted from the in-vehicle apparatus 1, the information management unit 114 updates the travel history DB 121 based on this latest travel history and reflects the latest travel history in the travel history DB 121.

Figure 3:
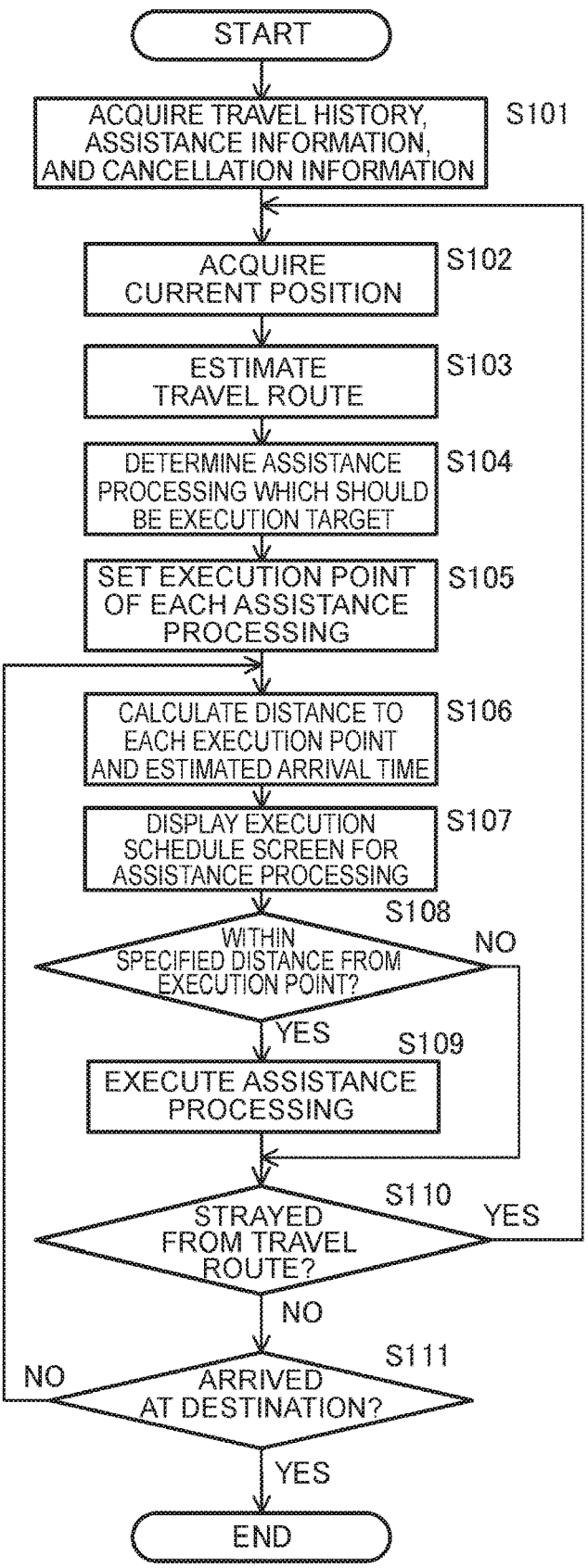
FIG. 3 is a flowchart illustrating actions of the in-vehicle apparatus in the information provision system according to one embodiment of the present invention.

Next, the details of actions of the in-vehicle apparatus 1 and the server 4 when providing the user with information will be explained. FIG. 3 is a flowchart illustrating the actions of the in-vehicle apparatus 1 in the information provision system according to one embodiment of the present invention. In this embodiment, the control unit 10 for the in-vehicle apparatus 1 executes a processing flow illustrated in FIG. 3, for example, for each specified processing cycle.

In step 3101, the control unit 10 acquires the travel history of the vehicle 100, the assistance information, and the cancellation information from the server 4. Under this circumstance, the control unit 10 transmits a distribution request for the travel history, the assistance information, and the cancellation information to the server 4 by using the communication control unit 11. After receiving the distribution request from the in-vehicle apparatus 1 the server 4 has the distribution unit 112 acquire the travel history of the vehicle 100 from the travel history DB 121 and acquire the assistance information which can be executed by the in-vehicle apparatus 1 and the cancellation information of the user of the in-vehicle apparatus 1 from the assistance information DB 122 and the cancellation information DB 123, respectively. Then, the travel history, the assistance information, and the cancellation information, which have been acquired, are distributed to the in-vehicle apparatus 1. After receiving the travel history, the assistance information, and the cancellation information which are thus distributed from the server 4, the control unit 10 stores these pieces of information in the travel history DB 22, the assistance information DB 23, and the cancellation information DB 24, respectively, and completes the processing in step 3101.

In step S102, the control unit 10 has the current position acquisition unit 13 acquire the current position from the current position detection unit 50.

In step S103, the control unit 10 has the route estimation unit 17 estimate the travel route of the vehicle 100. Under this circumstance, the user's destination is estimated by referring to the travel history DB 22 and taking into consideration the current position acquired in step S102, the current date and time, the user's schedule information, and so on. Then, the travel route of the vehicle 100 is estimated by searching for the route to the destination estimated based on the map DB 21 and the travel history DB 22. Regarding the user's schedule information, for example, information previously registered by the user is recorded as part of the user information in the user information DB 125 of the server 4, so that this schedule information can be used to estimate the travel route by acquiring the schedule information from the server 4. Incidentally, when the route to the destination which is set by the user is guided by using a navigation function of the in-vehicle apparatus 1, the processing in step S103 may be omitted by using this route as the travel route of the vehicle 100. Furthermore, a road which extends ahead of the vehicle 100 may be estimated as the travel route of the vehicle 100 without estimating the destination.

In step S104, the control unit 10 has the assistance processing unit 18 decide the assistance processing which should be an execution object. Under this circumstance, for example, each assistance processing which can be executed by the assistance processing unit 18 based on the assistance information stored in the assistance information DB 23 is classified on each function basis according to its content. Then, whether the relevant assistance processing should be the execution object or not is decided with respect to each assistance processing on the basis of the assistance processing setting conditions which are previously set. Under this circumstance, the assistance processing regarding which the cancellation operation from the user was accepted on the execution schedule screen in the past should preferably be excluded from execution objects, regardless of the setting conditions. Incidentally, the details of the cancellation operation will be explained later.

In step S105, the control unit 10 has the assistance processing unit 18 set a point for executing each assistance processing which was decided as the execution object in step S104. Under this circumstance, at which point along the travel route each assistance processing which is the execution object should be executed is decided in accordance with the travel route estimated in step S103. For example, the assistance processing which should be executed respectively at a starting point of the travel route, along the way, and near the destination is decided on the basis of the aforementioned functional classification of the assistance processing and the relevant point is set as the execution point of each assistance processing. Furthermore, the execution point of the assistance processing may be set based on the travel history DB 22. For example, if the travel history DB 22 includes a point where the user performed a specified operation in the past, for example, where the user performed the operation to display images captured by the front camera 5a on the display unit 30, the relevant point is set as the execution point of the assistance processing for displaying the images captured by the front camera 5a. Besides this, the assistance processing unit 18 can set various points along the travel route as execution points of the respective assistance processing sequences.

In step S106, the control unit 10 calculates the distance from the current position to each execution point which was set in step S105, and estimated arrival time at each execution point on the basis of the map DB 21 in accordance with the travel route estimated in step S103.

In step S107, the control unit 10 has the display control unit 14 perform control to display the execution schedule screen on the display unit 30 to notify the user in advance of each assistance processing which is scheduled to be executed by the assistance processing unit 18 on the basis of each execution result in step S103 to step S106. Under this circumstance, the control is performed to display screens like those illustrated in FIG. 4 to FIG. 6 described later as an execution schedule screen on the display unit 30.

In step S108, the control unit 10 judges whether or not the vehicle 100 has approached to within a specified distance from any one of the execution points of the respective assistance processing sequences which were set in step S105, on the basis of the current position detected by the current position detection unit 50. As a result, if the vehicle 100 has approached to any one of the execution points, the processing proceeds to step S109; and if the vehicle has not approached to any one of the execution points, the processing proceeds to step S110.

In step S109, the control unit 10 has the assistance processing unit 18 execute the assistance processing corresponding to the execution point which was judged in step S108 that the vehicle 100 had approached to within the specified distance. Under this circumstance, the user is provided with various information by executing the relevant assistance processing by using the assistance information stored in the assistance information DB 23. The user is provided with information which is useful for the user by, for example, acquiring the content such as the weather forecast at the destination, the user's schedule information, and music according to the user's taste from the server 4 and outputting such content as images and sounds, and displaying images indicating the ambient environment of the vehicle 100, which are generated based on the images captured by the camera 5.

In step S110, the control unit 10 judges whether or not the vehicle 100 has strayed from the travel route estimated in step S103 on the basis of the current position detected by the current position detection unit 50. If the vehicle 100 has strayed from the travel route, a new travel route according to the current position after having strayed from the travel route is estimated by returning to step S102 and executing the processing in step S102 and subsequent steps again; and an execution point(s) of the assistance processing according to that travel route is set again, thereby updating the execution schedule screen displayed on the display unit 30. On the other hand, if the vehicle 100 has not strayed from the travel route, the processing proceeds to step S111.

In step S111, the control unit 10 judges whether or not the vehicle 100 has arrived at the destination of the travel route estimated in step S103, on the basis of the current position detected by the current position detection unit 50. If the vehicle 100 has not arrived at the destination, the assistance processing is executed and the user is provided with the information by returning to step S106 and executing the processing in step S106 and subsequent steps again every time the vehicle 100 has approached to any one of the execution points. On the other hand, if the vehicle 100 has arrived at the destination, the control unit 10 terminates the processing flow in FIG. 3.

Figure 4:
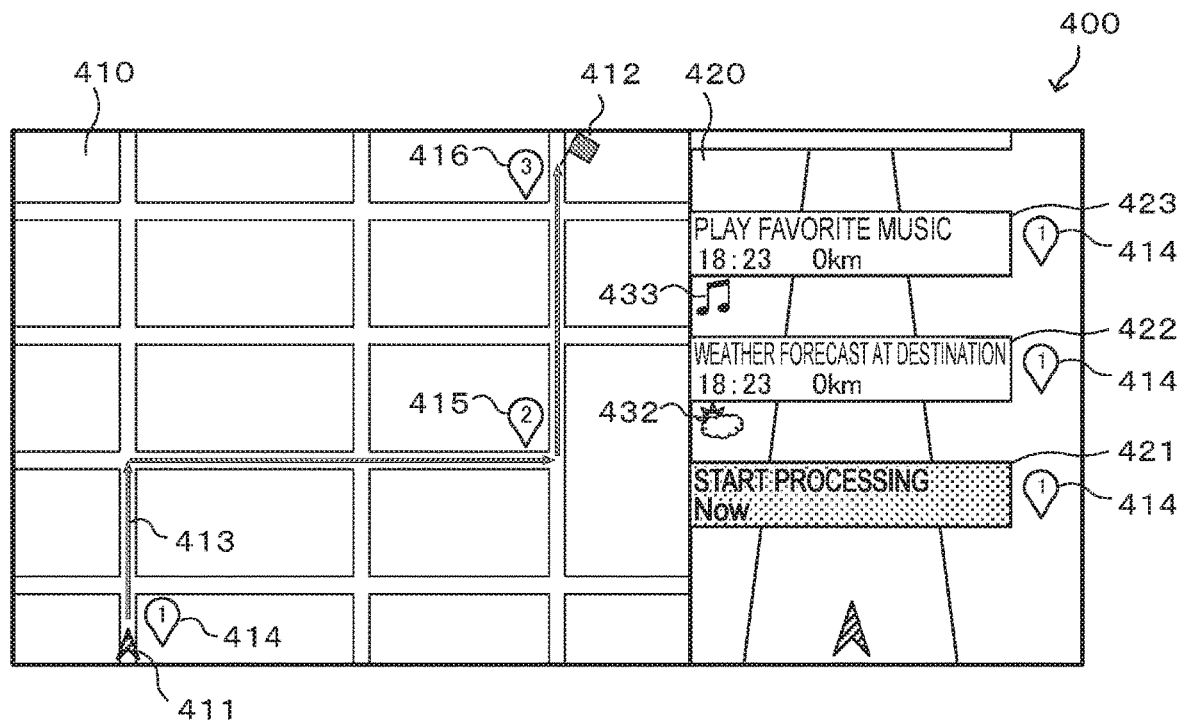
FIG. 4 is a diagram illustrating an example of an execution schedule screen.
Figure 5:
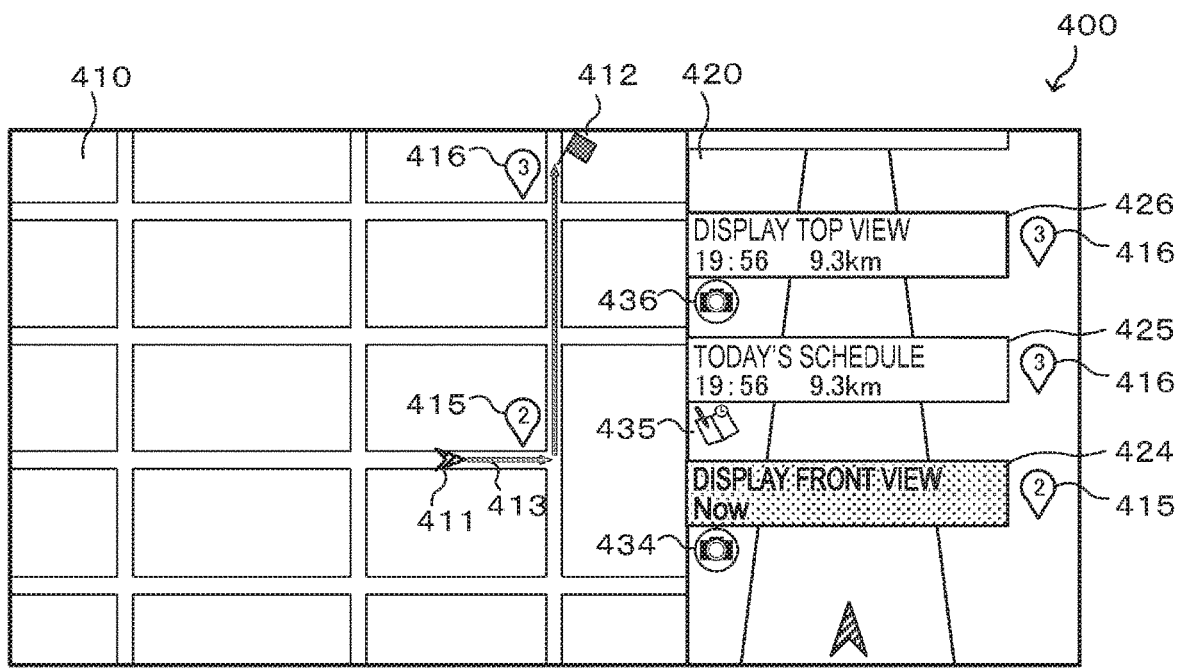
FIG. 5 is a diagram illustrating an example of the execution schedule screen.
Figure 6:
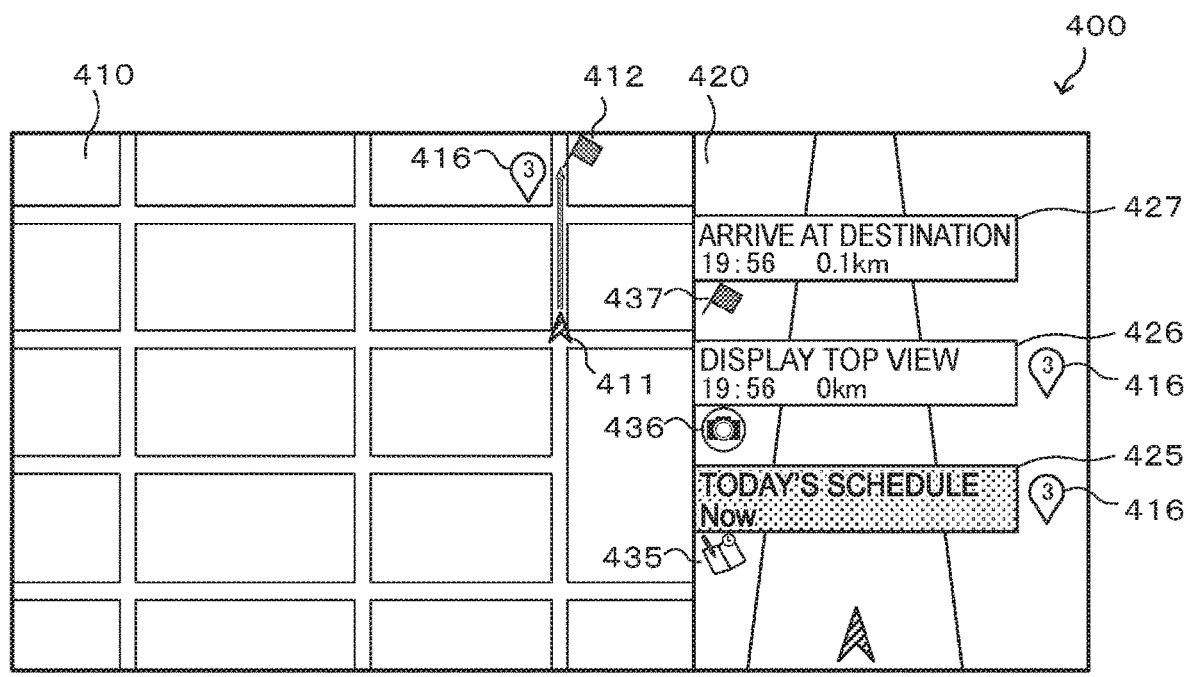
FIG. 6 is a diagram illustrating an example of the execution schedule screen.

Next, specific examples of the execution schedule screen displayed on the display unit 30 for the in-vehicle apparatus 1 in step S107 will be explained with reference to FIG. 4 to FIG. 6. FIG. 4 to FIG. 6 are diagrams respectively illustrating the examples of the execution schedule screen.

Immediately after the in-vehicle apparatus 1 is activated and the vehicle 100 starts traveling, for example, an execution schedule screen 400 illustrated in FIG. 4 is displayed on the display unit 30. The execution schedule screen 400 in FIG. 4 is configured by including a map screen 410 on the left side and a list screen 420 on the right side.

Regarding the map screen 410 in FIG. 4, a travel route 413 from a current position 411 to a destination 412 is displayed on a map and execution point icons 414, 415, 416 indicating that they are execution points are displayed at the respective positions on the map corresponding to the execution points of the assistance processing. Incidentally, in the example of FIG. 4, each icon can be identified by assigning the numbers "1," "2," and "3" to the execution point icons 414, 415, 416, respectively; however, each icon can be made identifiable in other manners by, for example, changing colors or patterns.

Regarding the list screen 420 in FIG. 4, top three assistance processing sequences 421 to 423 in the sequential execution order from among a plurality of assistance processing sequences which are scheduled to be executed by the assistance processing unit 18 are listed and displayed according to their sequential execution order. The assistance processing 421: is processing for, for example, greeting the user when the vehicle 100 starts traveling; and is executed immediately after the in-vehicle apparatus 1 is activated. FIG. 4 illustrates the execution schedule screen 400 when the assistance processing unit 18 is executing the assistance processing 421. The assistance processing 422 is processing for providing the weather forecast at the destination 412 and the assistance processing 423 is processing for playing the user's favorite music.

Furthermore, the listed and displayed assistance processing sequences 421 to 423 are displayed in such a manner that each of them is associated with the same execution point icon 414 as that in the map screen 410. Consequently, you can see that the assistance processing sequences 421 to 423 will be sequentially executed when the vehicle 100 approaches to the relevant execution point indicated with the execution point icon 414 on the map screen 410. Furthermore, icons 432, 433 according to the types of information provided to the user by executing the relevant assistance processing are displayed at, and are associated with, the assistance processing sequences 422, 423.

The assistance processing sequence 421 which is being executed by the assistance processing unit 18 is displayed in a display form different from that of other assistance processing sequences 422, 423 on the list screen 420 in FIG. 4. Accordingly, the user can tell at a glance which assistance processing is being executed at the in-vehicle apparatus 1. Meanwhile, scheduled execution time and the distance from the current position 411 to each execution point is displayed at each of the assistance processing sequences 422, 423. With these pieces of information and the icons 432, 433, the user can tell at a glance what kind of information is scheduled to be provided at which timing.

When the vehicle 100 travels along the travel route 413 and approaches to an execution point indicated with an execution point icon 415, for example, the execution schedule screen 400 changes as illustrated in FIG. 5. With the execution schedule screen 400 in FIG. 5, as the current position 411 moves on the map screen 410, the travel route 413 shortens according to the current position 411 after the movement. Furthermore, the execution point icon 414 in FIG. 4 corresponding to the execution point where the vehicle 100 had already passed has been deleted.

With the list screen 420 in FIG. 5, assistance processing sequences 424 to 426 are listed and displayed in the sequential execution order instead of the assistance processing sequences 421 to 423 in FIG. 4. The assistance processing 424 is processing for displaying a front view image of the vehicle 100, that is, an image captured by the front camera 5a when the vehicle 100 enters an intersection with poor visibility. FIG. 5 illustrates the execution schedule screen 400 where the assistance processing unit 18 is executing the assistance processing 424. The assistance processing 425 is processing for notifying the user of their today's schedule and the assistance processing 426 is processing for displaying an image indicating the circumstance of the ambient environment of the vehicle 100 on the basis of a top view image of the vehicle 100, that is, an image captured by the camera 5 when the user parks the vehicle 100.

Furthermore, the same execution point icons 415, 416 as those on the map screen 410 are displayed at, and are associated with, the listed and displayed assistance processing sequences 424 to 426 in the same manner as in FIG. 4. Consequently, you can see that: the assistance processing 424 is executed by the assistance processing unit 18 when the vehicle 100 approaches to the execution point indicated with the execution point icon 415 on the map screen 410; and the assistance processing sequences 425, 426 are executed sequentially by the assistance processing unit 18 when the vehicle 100 approaches to an execution point indicated with an execution point icon 416 on the map screen 410. Furthermore, Furthermore, icons 434 to 436 according to the types of information provided to the user by executing the relevant assistance processing are displayed at, and are associated with, the assistance processing sequences 424 to 426.

The assistance processing sequence 424 which is being executed by the assistance processing unit 18 is displayed in a display form different from that of other assistance processing sequences 425, 426 on the list screen 420 in FIG. 5 in the same manner as in FIG. 4. Furthermore, scheduled execution time and the distance from the current position 411 to each execution point are displayed at each of the assistance processing sequences 425, 426.

When the vehicle 100 further travels along the travel route 413 and approaches to the execution point indicated with the execution point icon 416, for example, the execution schedule screen 400 changes as illustrated in FIG. 6. With the execution schedule screen 400 in FIG. 6, as the current position 411 further moves on the map screen 410, the travel route 413 further shortens according to the current position 411 after the movement. Furthermore, in addition to the execution point icon 414, the execution point icon 415 in FIG. 4 and FIG. 5 corresponding to the execution point where the vehicle 100 had already passed has been deleted.

With the list screen 420 in FIG. 6, the display positions of the assistance processing sequences 425, 426 have moved from those in FIG. 5 and the assistance processing 424 in FIG. 5 has been deleted. Furthermore, assistance processing 427 is newly listed and displayed in the list, following the assistance processing sequences 425, 426. The assistance processing 427 is processing for notifying the user that the vehicle 100 has arrived at the destination 412. An icon 437 similar to the destination 412 is displayed at, and is associated with, the assistance processing 427. Incidentally, FIG. 6 illustrates the execution schedule screen 400 where the assistance processing unit 18 is executing the assistance processing 425.

The assistance processing sequence 425 which is being executed by the assistance processing unit 18 is displayed in a display form different from that of other assistance processing sequences 426, 427 on the list screen 420 in FIG. 6 in the same manner as in FIG. 4 and FIG. 5. Furthermore, scheduled execution time and the distance from the current position 411 to the relevant execution point are displayed at the assistance processing 426 and the scheduled execution time and the distance from the current position 411 to the destination 412 are displayed at the assistance processing 427.

The in-vehicle apparatus 1 according to this embodiment can notify the user in advance of each assistance processing which is scheduled to be executed by the assistance processing unit 18 by displaying the above-described execution schedule screen 400 on the display unit 30.

Next, adjustments of the setting conditions for the assistance processing will be explained. With the in-vehicle apparatus 1, the setting conditions for each assistance processing are set in advance as explained earlier. These setting conditions can be adjusted arbitrarily by a developer or the user by using information equipment such as a personal computer.

Figure 7:
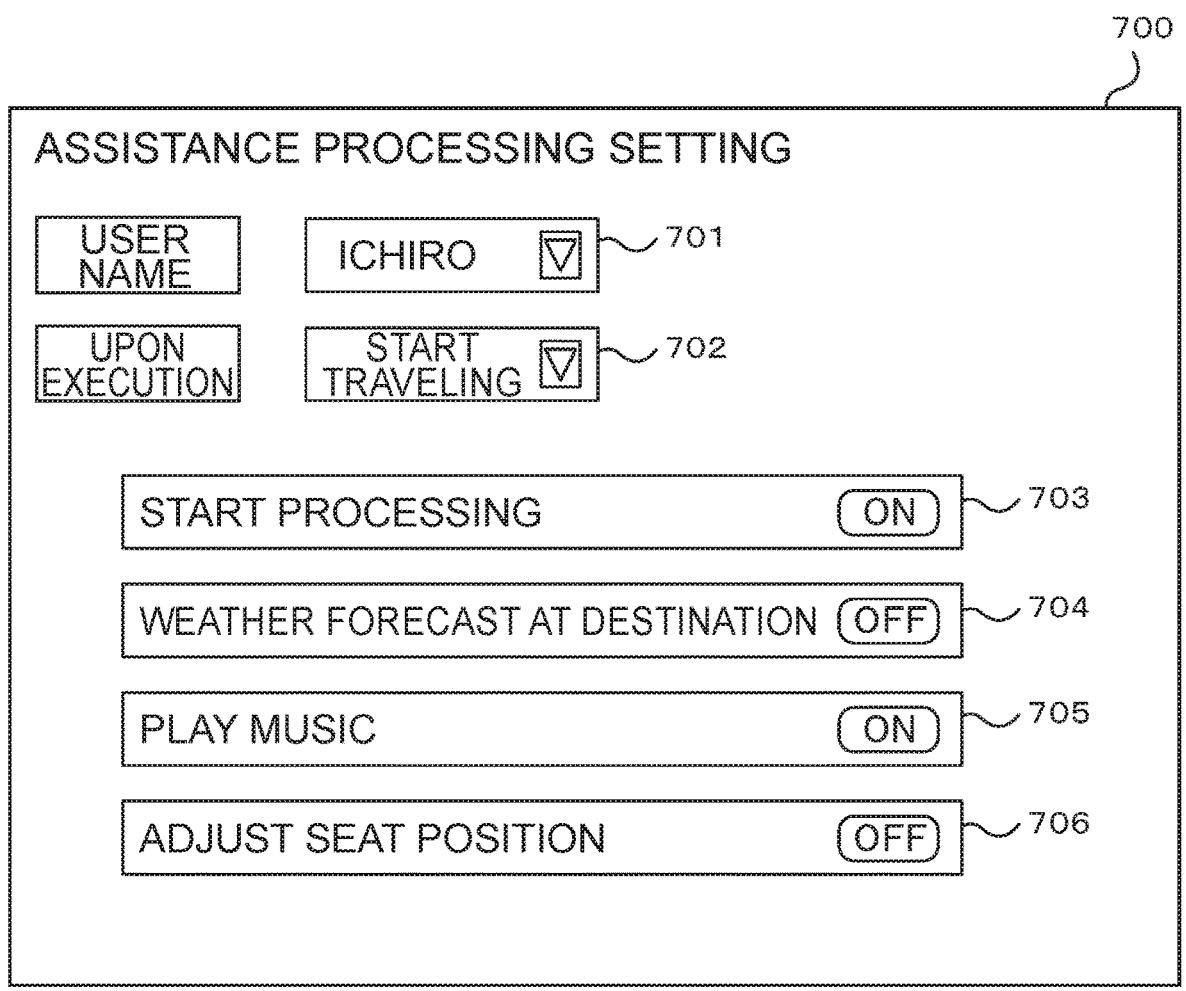
FIG. 7 is a diagram illustrating a display screen example when adjusting setting conditions for assistance processing.

FIG. 7 is a diagram illustrating a display screen example when adjusting the setting conditions for the assistance processing. Selection fields 701 to 706 are displayed on a display screen 700 in FIG. 7. The selection field 701 is a field for selecting a user name. The selection field 702 is a field for selecting the assistance processing which should be an object to adjust the setting conditions. The example in FIG. 7 is designed so that a plurality of assistance processing sequences belonging to the relevant functional classification can be selected as objects to adjust the setting conditions by selecting, in the selection field 702, the execution timing according to the functional classification of the assistance processing. The selection fields 703 to 706 are fields for selecting whether each assistance processing should be the execution object or not. These selection fields 703 to 706 are designed so that either "ON" or "OFF" can be selected with respect to each assistance processing corresponding to the execution timing selected in the selection field 702. The assistance processing regarding which "ON" is selected here is decided as the execution object in step S104 in FIG. 3 and the assistance processing regarding which "OFF" is selected is excluded from the execution objects in step S104 in FIG. 3.

The developer or the user of the in-vehicle apparatus 1 can arbitrarily adjust the setting conditions for each assistance processing by causing the information equipment such as a personal computer connected to the in-vehicle apparatus 1 and the server 4 to display the display screen 700 in FIG. 7 and performing each of selection operations in the selection fields 701 to 706 on this display screen 700. Incidentally, the adjusted setting conditions may be stored in the storage unit 20 for the in-vehicle apparatus 1 or may be stored in the user information DB 125 as part of the user information in the storage unit 120 for the server 4.

Incidentally, regarding the display screen 700 in FIG. 7, the screen example in which whether the assistance processing should be the execution object or not can be selected with respect to each functional classification; however, the functional classification of the assistance processing may be changed arbitrarily. In this case, the developer or the user of the in-vehicle apparatus 1 can arbitrarily adjust which assistance processing should be executed at which timing by changing the functional classification of each assistance processing. Furthermore, the setting conditions for the assistance processing may be adjusted by setting execution conditions for each assistance processing and executing the relevant assistance processing when such execution conditions are satisfied. Besides this, the developer or the user of the in-vehicle apparatus 1 can adjust the setting conditions for the assistance processing by an arbitrary method.

Next, the cancellation operation of the assistance processing will be explained. With the in-vehicle apparatus 1 as described earlier, the assistance processing to be excluded from the execution objects can be selected, regardless of the setting conditions, by the user performing the cancellation operation on the execution schedule screen. For example, a flick operation, a swipe operation, a specified gesture operation, and sound input on the touch panel are used for this cancellation operation. The cancellation operation which is input by the user is accepted by the operation input unit 40 in the in-vehicle apparatus 1 and is then reflected in subsequent processing.

Specifically speaking, when the cancellation operation from the user is input to the operation input unit 40, the control unit 10 stores the ID of a script file corresponding to the assistance processing; regarding which the cancellation operation has been performed, as cancellation information in the cancellation information DB 24. The assistance processing unit 18 identifies the script file corresponding to the assistance processing, regarding which the user has performed the cancellation operation so far, based on the cancellation information stored in the cancellation information DB 24 and avoids executing the relevant script file. Furthermore, under this circumstance, the display control unit 14 is made to display a blackout image of the assistance processing corresponding to the relevant scrip file on the list screen 420.

Furthermore, the user can cancel the cancellation operation which was performed in the past. When an specified operation to cancel the cancellation operation is input by the user to the operation input unit 40 with respect to any one of the assistance processing sequences for which the cancellation operation has already been performed, the control unit 10 deletes the cancellation information corresponding to the relevant assistance processing from the cancellation information DB 24. As a result, the relevant assistance processing can be made to become the execution object of the assistance processing unit 18 again. Furthermore, when this is performed, the display control unit 14 is used to cancel the blackout display of the relevant assistance processing on the list screen 420.

Incidentally, when the cancellation information DB 24 of the in-vehicle apparatus 1 is updated, that information is transmitted from the in-vehicle apparatus 1 to the server 4 at specified timing. The information management unit 114 for the server 4 updates the cancellation information DB 123 on the basis of the information transmitted from the in-vehicle apparatus 1.

Figure 8:
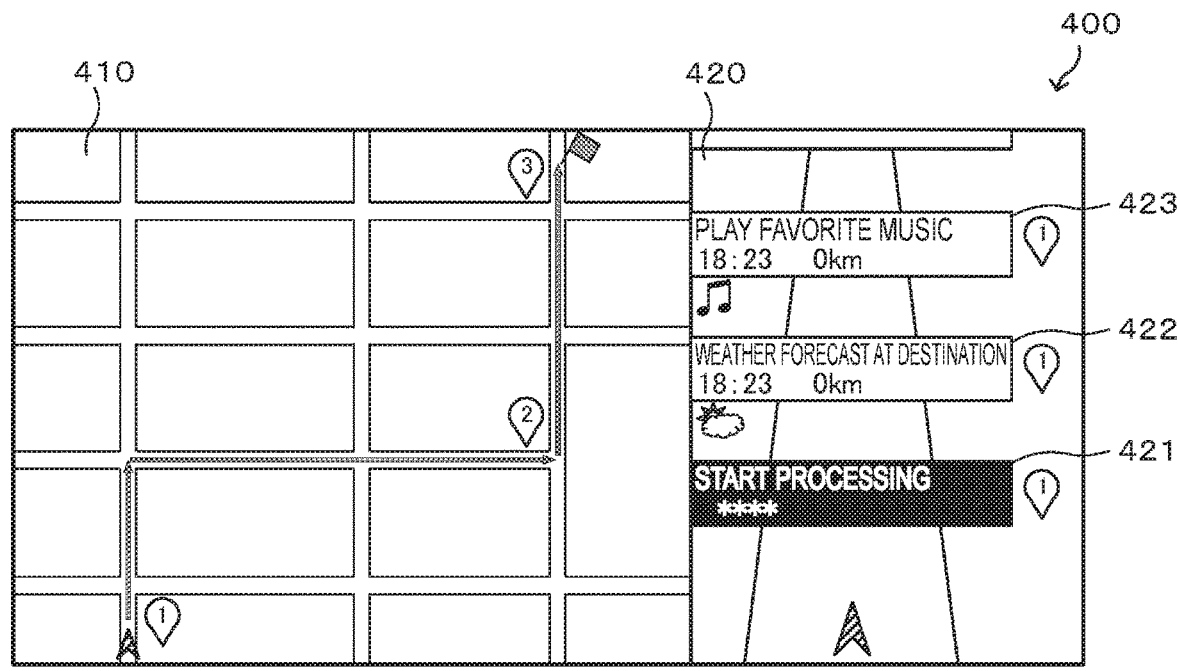
FIG. 8 is a diagram illustrating an example of the execution schedule screen after a cancellation operation.

FIG. 8 is a diagram illustrating an example of the execution schedule screen after the cancellation operation. FIG. 8 illustrates an example of a case where the cancellation operation is performed with respect to the assistance processing 421 on the execution schedule screen 400 in FIG. 4. This execution schedule screen 400 displays the assistance processing 421, regarding which the cancellation operation has been performed, by outlining characters on a black background from among the assistance processing sequences 421 to 423 listed and displayed on the list screen 420 on the right side. Accordingly, you can see that the assistance processing 421 has been canceled by the user and has been excluded from the execution objects of the assistance processing unit 18.

Figure 9:
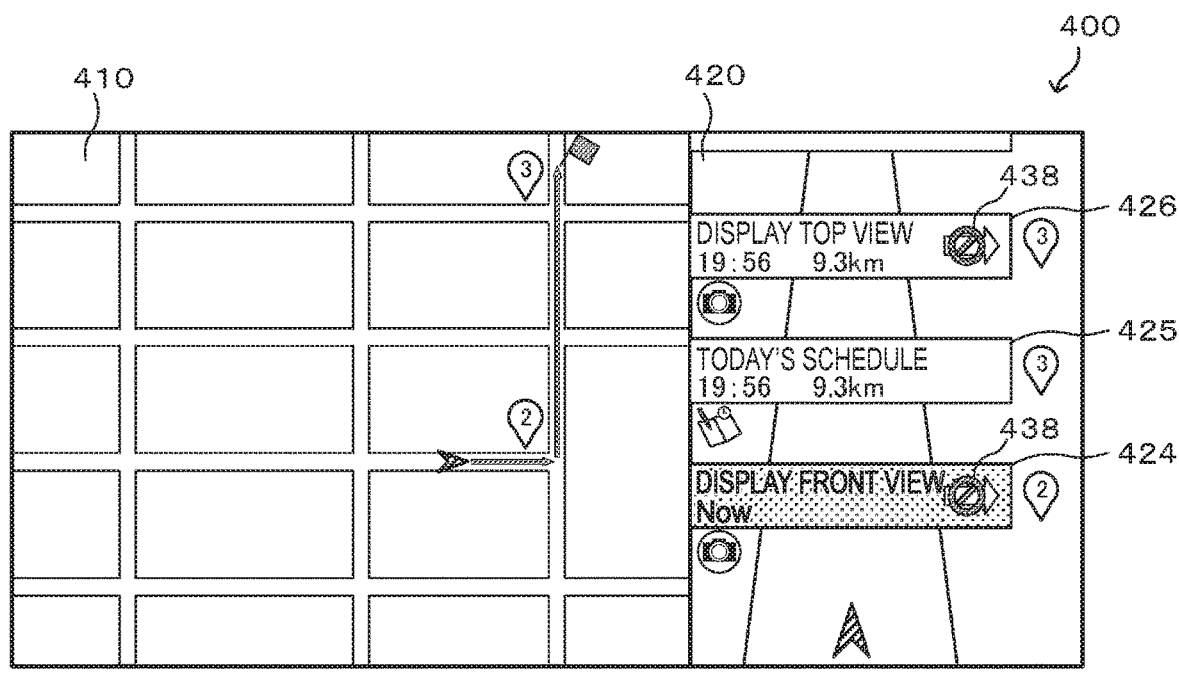
FIG. 9 is a diagram illustrating an example of the execution schedule screen where part of the assistance processing has been excluded from cancellation operation accepting objects.

However, for example, specified assistance processing which is highly important such as the assistance processing relating to the safety of the vehicle 100 may be excluded from cancellation operation accepting objects. FIG. 9 is a diagram illustrating an example of the execution schedule screen where some of the assistance processing sequences have been excluded from the cancellation operation accepting objects. FIG. 9 illustrates an example of a case where each of the assistance processing sequences 424, 426 has been excluded from the cancellation operation accepting objects on the execution schedule screen 400 in FIG. 5. With this execution schedule screen 400, an icon 438 indicating that the cancellation operation is impossible is displayed with respect to each of the assistance processing sequences 424, 426 excluded from the cancellation operation accepting objects from among the assistance processing sequences 424 to 426 listed and displayed on the list screen 420 on the right side. Consequently, the display form of the assistance processing 424, 426 is different from that of the other assistance processing 425 and, therefore, you can tell that the assistance processing sequences 424, 426 have been excluded from the cancellation operation accepting objects.

Incidentally, the above-explained icon 438 indicating that the cancellation operation is impossible may be always displayed on the execution schedule screen 400 or may be displayed while the vehicle 100 is traveling. Specifically speaking, when the vehicle 100 is traveling, the icon 438 may be displayed to disable the cancellation operation; and when the vehicle 100 is stopped, the icon 438 may be deleted and the input of the cancellation operation may be permitted. By doing so, it is possible to prevent the user from performing the cancellation operation while driving the vehicle 100 and thereby enhance the safety. Furthermore, when the vehicle 100 is automatically driven, the icon 438 can be deleted and the input of the cancellation operation can be permitted even if the vehicle 100 is traveling.

According to one embodiment of the present invention explained above, the following operational advantages can be obtained.

(1) The in-vehicle apparatus 1 mounted in the vehicle 100 includes: the assistance processing unit 18 that executes the assistance processing for providing the user with specified information; and the display control unit 14 that performs control to have the display unit 30 display the execution schedule screen 400 for notifying the user in advance of a plurality of assistance processing sequences which are scheduled to be executed by the assistance processing unit 18. The execution schedule screen 400 includes the list screen 420 which is a list of the assistance processing sequences to be executed by the assistance processing unit 18 in the sequential order. Consequently, the in-vehicle apparatus 1 can alleviate the user's sense of discomfort when providing the information.

(2) When the vehicle 100 has approached to within a specified distance from the set execution point (step S108 in FIG. 3: Yes), the assistance processing unit 18 executes the assistance processing (step S109). The display control unit 14 performs control to have the display unit 30 display the execution schedule screen 400 which further includes the map screen 410 in which the execution point(s) of the assistance processing is indicated on the map. Consequently, it is possible to notify the user, in advance in an easily comprehensible manner, of the execution point(s) where the assistance processing is scheduled to be executed.

(3) The display control unit 14 performs control to have the display unit 30 display the execution point icons 414 to 416 which associates the execution points of the assistance processing displayed on the map screen 410 with the plurality of assistance processing sequences 421 to 426 listed and displayed on the list screen 420 according to the sequential execution order (step S107 in FIG. 3). Consequently, it is possible to notify the user of which assistance processing will be executed at which execution point in an easily comprehensible manner.

(4) The display control unit 14 performs control to have the display unit 30 display the list screen 420 by changing the display form of the assistance processing, which is being executed by the assistance processing unit 18, from the display form of the other assistance processing (FIG. 4 to FIG. 6). Consequently, it is possible to notify the user of which assistance processing is currently being executed in an easily comprehensible manner.

(5) The in-vehicle apparatus 1 further includes the operation input unit 40 that accepts the cancellation operation with respect any one of the plurality of assistance processing sequences as input by the user on the list screen 420. The assistance processing unit 18 excludes the assistance processing 421, regarding which the operation input unit 40 has accepted the cancellation operation, from the execution objects (FIG. 8). Consequently, the user can easily exclude the unnecessary assistance processing from the execution objects.

(6) The operation to cancel the cancellation operation from the user can be input to the operation input unit 40. When the operation to cancel the cancellation operation is input to the operation input unit 40, the assistance processing unit 18 causes the assistance processing excluded from the execution objects to become an execution object again. Consequently, the user can make the assistance processing, which was excluded from the execution objects once, become the execution object again.

(7) The operation input unit 40 may accept the cancellation operation by excluding specified assistance processing from among the plurality of assistance processing sequences listed and displayed on the list screen 420. In this case, the display control unit 14 should preferably perform control to have the display unit 30 display the list screen 420 by changing the display form of the assistance processing sequences 424, 426, which are excluded from the cancellation operation accepting objects by the operation input unit 40, from the display form of other assistance processing as illustrated in FIG. 9. Consequently, it is possible to execute the highly-important assistance processing without fail and notify the user to that effect with certainty.

Incidentally; the above-explained embodiment has described the example where the in-vehicle apparatus 1 acquires the travel history of the vehicle 100 and the assistance information from the server 4; however, these pieces of information may be stored in the in-vehicle apparatus 1 in advance. In this case, the in-vehicle apparatus 1 may be designed to be capable of directly acquire the necessary content without intervention of the server 4, so that the in-vehicle apparatus 1 will not be connected to the server 4. Specifically speaking, in this case, the server 4 is unnecessary and the present invention can be implemented by only the in-vehicle apparatus 1.

Furthermore, the above-explained embodiment has described the screen example which does not include information about an automatic driving schedule of the vehicle 100 as the execution schedule screen 400; however, the execution schedule screen 400 may be displayed by including the information about the automatic driving schedule. For example, the information about the automatic driving schedule can be displayed on the execution schedule screen 400 by indicating a scheduled starting point and scheduled ending point of the automatic driving on the map on the map screen 410 and listing and displaying a starting schedule and ending schedule of the automatic driving together with the assistance processing on the list screen 420. Besides this, the information about the automatic driving schedule of the vehicle 100 can be presented to the user in an arbitrary manner.

The above-explained embodiment has described the example where the execution schedule screen 400 is displayed on the display unit 30 included in the in-vehicle apparatus 1; however, the execution schedule screen 400 may be displayed on an external display device connected to the in-vehicle apparatus 1. For example, an HUD (Head-Up Display), projection mapping, or a wearable display device such as a spectacle-type display can be used as the external display device. Furthermore, a display of, for example; a smartphone, a tablet PC, or a notebook PC can also be used as the external display device.

The above-described embodiments and variations are merely examples. The present invention is not limited to the above-described embodiments unless they impair the features of the present invention; and other aspects which can be thought of within the scope of the technical idea of the present invention are also included within the scope of the present invention.

The disclosure of the following priority basic application is hereby incorporated by reference.

Japanese Patent Application No. 2017-240002 (filed on Dec. 14, 2017)

REFERENCE SIGNS LIST

1: in-vehicle apparatus
2: communication terminal
3: communication line network
4: server
5a: front camera
5b: rear camera
5c: left-side camera
5d: right-side camera
7: vehicle control apparatus
10: control unit
11: communication control unit
12: interface control unit
13: current position acquisition unit
14: display control unit
15: vehicle information acquisition unit
16: vehicle control unit
17: route estimation unit
18: assistance processing unit
20: storage unit
21: map DB
22: travel history DB
23: assistance information DB
24: cancellation information DB
30: display unit
40: operation input unit
50: current position detection unit
100: vehicle
110: control unit
111: communication control unit
112: distribution unit
113: content acquisition unit
114: information management unit
120: storage unit
121: travel history DB
122: assistance information DB
123: cancellation information DB
124: content DB
125: user information DB

The invention claimed is:

1. An in-vehicle apparatus mounted in a vehicle comprising:
a processor including memory and associated circuitry that accesses the memory and executes a plurality of assistance processings for providing a user with specified information about the plurality of assistance processings, displayed on a display device, wherein the plurality of assistance processings includes two or more of weather forecast, reporting schedule information of the user, playing music according to the user's taste, and displaying environment images, wherein the execution time for each of the plurality of assistance processings is based on a travel route of the vehicle or based on travel history of the vehicle stored in the memory;

a display controller that displays, on the display device, a list of the assistance processing to be executed by the processor, in a first display format; and an input device that accepts a cancellation input from the user to exclude an assistance processing from being executed by the processor, wherein the display controller controls the display device to redisplay the plurality of assistance processings by changing the first display format of the excluded assistance processing from the first display format to a second display format.

2. The in-vehicle apparatus according to claim 1, wherein the display controller performs control to include and display, on the display device, a map screen indicating, on a map, a location point where the processor should execute an assistance processing.

3. The in-vehicle apparatus according to claim 2, wherein the display controller performs control to display, on the display device, an icon that associates the assistance processing executed by the processor displayed on the map screen with the assistance processing displayed in the list according to a sequential order.

4. The in-vehicle apparatus according to claim 1, wherein the display controller performs control to display, on the display device, the list by changing a display format of the assistance processing which is being executed by the processor from the display format of other assistance processings.

5. The in-vehicle apparatus according to claim 1, wherein an operation to cancel the cancellation operation from the user can be input to the input device; and wherein when the cancellation input is input to the input device, the processor causes the excluded assistance processing to become an executable assistance processing again.

6. A notification method for notifying a user of a schedule for executing assistance processing to be executed by an in-vehicle apparatus mounted in a vehicle, the method comprising:

creating a list of plurality of assistance processings for execution by a processor;

displaying the list of the assistance processing on a display device in a first display format, wherein the plurality of assistance processings includes two or more of weather forecast, reporting schedule information of the user, playing music according to the user's taste, and displaying environment images, wherein the execution time for each of the plurality of assistance processings is based on a travel route of the vehicle or based on travel history of the vehicle stored in the memory;

accepting a cancellation input from the user to exclude an assistance processing from being executed by the processor; and controlling the display device to redisplay the plurality of assistance processings by changing the first display format of the excluded assistance processing from the first display format to a second display format.

7. The notification method according to claim 6, wherein a map screen is displayed indicating, on a map, a location point where the assistance processing should be executed.

8. The notification method according to claim 7, further comprising displaying an icon that associates the assistance processing displayed on the map screen with the assistance processing displayed on a screen of the list according to a sequential execution order.

9. The notification method according to claim 6, further comprising causing the excluded assistance processing to become an executable assistance processing again.

* * * * *